United States Patent [19]

McLaughlin et al.

[11] Patent Number: 5,948,323
[45] Date of Patent: Sep. 7, 1999

[54] COLLOIDAL PARTICLES OF SOLID FLAME RETARDANT AND SMOKE SUPPRESSANT COMPOUNDS AND METHODS FOR MAKING THEM

[75] Inventors: John McLaughlin, Media, Pa.; Philip S. Podwirny, Haddonfield, N.J.; John C. Morley, Devon, Pa.

[73] Assignee: GLCC Technologies, Inc., West Lafayette, Ind.

[21] Appl. No.: 08/969,704

[22] Filed: Nov. 26, 1997

Related U.S. Application Data

[63] Continuation of application No. 08/483,032, Jun. 7, 1995, abandoned.

[51] Int. Cl.⁶ .............................. C09K 21/00; C09K 3/28
[52] U.S. Cl. ................................. 252/610; 252/2; 252/8; 252/601; 252/61; 241/16; 241/21; 427/191; 428/546
[58] Field of Search .................................. 252/2, 8, 601, 252/610, 611; 407/191; 428/546; 214/16, 21

[56] References Cited

U.S. PATENT DOCUMENTS

| | | | |
|---|---|---|---|
| 2,621,859 | 12/1952 | Phillips | 241/47 |
| 2,678,168 | 5/1954 | Phillips | 241/47 |
| 3,090,567 | 5/1963 | Schafer | 241/22 |
| 3,405,874 | 10/1968 | Brizon | 241/174 |
| 3,540,663 | 11/1970 | Dietz | 241/22 |
| 3,624,043 | 11/1971 | Siclari et al. | 260/75 |
| 3,676,362 | 7/1972 | Yates | 252/309 |
| 3,677,476 | 7/1972 | Harned | 241/21 |
| 3,759,500 | 9/1973 | Nerozzi | 266/9 |
| 3,816,080 | 6/1974 | Bomford et al. | 29/182.5 |
| 3,947,277 | 3/1976 | Carnahan et al. | 106/26 |
| 3,951,894 | 4/1976 | Whelan, Jr. | 106/15 FP |
| 3,969,570 | 7/1976 | Smith | 428/336 |
| 3,995,817 | 12/1976 | Brociner | 241/30 |
| 4,065,544 | 12/1977 | Hamling et al. | 423/252 |
| 4,075,032 | 2/1978 | Thomas | 106/303 |
| 4,120,798 | 10/1978 | Mischutin | 252/8 |
| 4,166,806 | 9/1979 | McKay et al. | 252/437 |
| 4,192,664 | 3/1980 | Joshi | 65/22 |
| 4,230,462 | 10/1980 | Moskowitz | 51/307 |
| 4,332,354 | 6/1982 | deMonterey et al. | 241/16 |
| 4,367,164 | 1/1983 | Shiroto et al. | 252/457 |
| 4,367,165 | 1/1983 | Asaoka et al. | 252/457 |
| 4,404,023 | 9/1983 | Glück | 75/0.5 R |
| 4,624,418 | 11/1986 | Szkaradek | 241/46.17 |
| 4,627,959 | 12/1986 | Gilman et al. | 419/61 |
| 4,647,304 | 3/1987 | Petkovic-Luton et al. | 75/0.5 R |
| 4,651,935 | 3/1987 | Samosky et al. | 241/65 |
| 4,676,439 | 6/1987 | Saito et al. | 241/172 |
| 4,680,204 | 7/1987 | Das et al. | 427/407.1 |
| 4,690,970 | 9/1987 | Feinauer et al. | 524/504 |
| 4,776,937 | 10/1988 | Gupta et al. | 204/157.45 |
| 4,787,561 | 11/1988 | Kemp, Jr. et al. | 241/30 |

(List continued on next page.)

FOREIGN PATENT DOCUMENTS

| | | |
|---|---|---|
| 55-104658 | 8/1980 | Japan. |
| 1507443 A2 | 9/1989 | U.S.S.R.. |
| 1366104 | 9/1974 | United Kingdom. |
| 1371588 | 10/1974 | United Kingdom. |
| WO 95/24359 | 9/1995 | WIPO .............................. C01G 9/02 |

OTHER PUBLICATIONS

J.R. McLaughlin, "Cookson Specialty Additives Know-How Transfer Document Colloidal Flame Retardants Sb2O3 and Halogen Compounds," Jul. 25, 1994.
"Best $Sb_2O_3$ run to date", Jun. 1994, 5 pages, Micron Analytical Services.
"Report #19258", Nov. 29,1994, 8 pages, Micron Analytical Services.
"Comparison of YTZ and Fused Zircon Media"; Peter J. Donnelly (TOSOH Corp.) and Hiroshi Ohnishi (Nikkato); "Powder and Bulk Engineering"; Jun. 1994.
"Sand Grinder and Szegvari Attritor"; "Paint Flow and Pigment Dispresion; A Rheological Approach to Paint and Ink"; Temple C. Patton; pp. 290–302; John Wiley and Son; 2nd Edition, Apr. 1979.
"YTZ Grinding Media", Technical Bulletin, TOSOH Corp.; Apr. 20, 1993.
"YTZ Ceramic Ball, High Wear–Resistant Zirconia Grinding Media"; TOSOH Corp. Technical Bulletin; Apr. 1991.
"Netzsch Grinding and Dispersing Equipment"; Netzsch Inc. –Product Bulletin, Sep. 1992.
"Alpine Mechanical Processing Technology –Fluidized Bed Opposed J. Mills AFG Type 100–1250"; Alpine AG –Hosakowa Micron Group Alpine Aktungesellschaft Leaflet 21/1e; Jun. 1984.
"Catalog TH980, Tri–homo colloid mills"; Sonic Corp; Mar. 1975.
"Micron Powder Systems: Acucut™ Ultrafine Air Classifiers"; Micron Powder Systems; Summit, N.J., 1991.
"Ceramic milling in Netzsch small media mills"; H. Way; Netzch Inc.; "Ceramic Processing Magazine"; Jun. 1994.
"Particle Size Reduction of Ceramic Powders using a Small Media Mill; Controlling factors in Milling"; Subhas Malghan–National Standards, 1993.
"Scaling Up Mills from Laboratory Size Equipment to Production Equipment", H. Way; Netzsch Inc.; 1988.
"Horizontal Milling Variables"; H. Way; Apr. 1993.

*Primary Examiner*—Shean C. Wu
*Attorney, Agent, or Firm*—Kenyon & Kenyon

[57] ABSTRACT

The present invention concerns finely divided particles of compounds that provide flame retardancy and/or smoke suppressant properties to fibers, textiles, polymeric articles, paper, paint, coating and insulation. More particularly, the present invention concerns colloidal-sized particles of hydrated salts, organic phosphates, metal borates, polyamides, solid halogenated flame retardants with a melting point greater than 250° C., molybdenum compounds, metallocenes, antimony compounds, zinc compounds, bismuth compounds and other solid chemicals which act as flame retardants or smoke suppressants. The present invention also concerns various milling processes to reduce these materials to colloidal sizes and to disperse them in water, organic liquids and meltable solids.

39 Claims, No Drawings

U.S. PATENT DOCUMENTS

| | | | |
|---|---|---|---|
| 4,844,355 | 7/1989 | Kemp, Jr. et al. | 241/172 |
| 4,913,361 | 4/1990 | Reynolds | 241/259.2 |
| 4,927,795 | 5/1990 | Tabler et al. | 502/33 |
| 4,966,331 | 10/1990 | Maier et al. | 241/172 |
| 5,033,682 | 7/1991 | Braun | 241/16 |
| 5,065,946 | 11/1991 | Nishida et al. | 241/16 |
| 5,075,206 | 12/1991 | Noda et al. | 430/531 |
| 5,083,712 | 1/1992 | Askew et al. | 241/16 |
| 5,112,388 | 5/1992 | Schultz et al. | 75/255 |
| 5,145,684 | 9/1992 | Liversidge et al. | 424/489 |
| 5,147,449 | 9/1992 | Grewe et al. | 75/354 |
| 5,171,484 | 12/1992 | Nishimura et al. | 252/62.9 |
| 5,246,488 | 9/1993 | Tanaka et al. | 106/14.44 |
| 5,246,504 | 9/1993 | Ohta et al. | 136/201 |
| 5,270,076 | 12/1993 | Evers | 427/220 |
| 5,281,128 | 1/1994 | Dalla et al. | 431/7 |
| 5,281,379 | 1/1994 | Noguchi et al. | 264/102 |
| 5,283,229 | 2/1994 | Narayanan et al. | 504/116 |
| 5,294,584 | 3/1994 | Yoshida et al. | 502/242 |
| 5,338,712 | 8/1994 | MacMillan et al. | 501/94 |
| 5,350,437 | 9/1994 | Watanabe et al. | 75/346 |
| 5,409,980 | 4/1995 | Myszak, Jr. | 524/409 |
| 5,704,556 | 1/1998 | McLaughlin | 241/21 |
| 5,786,077 | 7/1998 | McLaughlin | 428/331 |

COLLOIDAL PARTICLES OF SOLID FLAME RETARDANT AND SMOKE SUPPRESSANT COMPOUNDS AND METHODS FOR MAKING THEM

This Application is a Continuation of Ser. No. 08/483,032 filed Jun. 7, 1995, abandoned.

FIELD OF THE INVENTION

The present invention concerns finely divided particles of compounds that provide flame retardancy and/or smoke suppressant properties to fibers, textiles, polymeric articles, paper, paint, coatings and insulation. More particularly, the present invention concerns colloidal-sized particles of hydrated salts, organic phosphates, metal borates, polyamides, solid halogenated flame retardants with a melting point greater than 250° C., molybdenum compounds, metallocenes, antimony compounds, zinc compounds, bismuth compounds and other solid chemicals which act as flame retardants or smoke suppressants. The present invention also concerns various milling processes to reduce these materials to colloidal sizes and to disperse them in water, organic liquids and meltable solids.

BACKGROUND OF THE INVENTION

The ability of various solids to act as flame retardants and/or smoke suppressants is known in the art. Such solids act by various mechanisms to provide flame retardancy including the following:

a) Release of Water and/or Carbon Dioxide—Hydrated salts (such as magnesium sulfate pentahydrate, aluminum trihydrate, magnesium hydroxide, hydrated magnesium carbonate and so forth) decompose at high temperatures, and release water and or carbon dioxide in an endothermic reaction to quench a fire.

b) Char Formation—When exposed to high temperatures, char formers, which include organic phosphates, zinc compounds, nitrogen compounds (such as melamine esters and polyamides) and metal borates, form char barriers which insulate the combustible materials from the fire.

c) Free Radical Capture/Oxygen Deprivation—Halogen compounds alone or in combination with antimony will prevent combustion. The primary mechanism is believed to be the formation of a dense gas layer above the burning substance that inhibits or prevents oxygen from reaching the combustible material. There is also evidence in support of the ability of antimony halides to scavenge free radicals in the flame, stopping the reaction.

d) Smoke Suppression—Smoke suppressants work by aiding the complete oxidation of carbonaceous materials formed in the flame and/or the formation of char or glasses. They are usually catalysts for oxidation reactions and/or char or glass formers. Typical smoke suppressants are molybdenum oxide and ferrocene or other metallocenes.

All of the above listed solids are used commercially to provide either flame retardancy or low smoke generation to plastics, carpets, fabrics, paper, paints, coatings, adhesives, wood composites and so forth. Unfortunately, the use of such solids often imparts other undesirable properties to the item to which they are added. Typical undesirable properties that result from adding solid particles of flame retardant or smoke suppressant compounds include: pigmentation (.e.g., addition of unwanted colors), opacity (e.g., loss of light transmission), stiffness (e.g., loss of hand in textiles), lowered impact strength (resulting, e.g., an increase in crack propagation), and setting of solids (in, e.g., paints, coatings and adhesives). Such undesirable properties can be reduced or eliminated by reducing average particle size and eliminating substantially all particles above about 1 micron.

SUMMARY OF THE INVENTION

Accordingly, it is an object of this invention to provide colloidal particles (particles having a size ranging from $10^{-9}$ to $10^{-6}$ m) of solid flame retardant and/or smoke suppressant compounds, including hydrated salts (such as aluminum trihydrate, magnesium sulphate pentahydrate, magnesium hydroxide and hydrated magnesium carbonate), ammonium polyphosphate, organic phosphates (such as melamine pyrophosphate), metal borates (such as zinc borate and barium metaborate), polyamides, melamine, solid halogenated flame retardants with a melting point greater than 250° C. (such as brominated polymers, decabromodiphenyloxide, ethylene bistetrabromophthalamide, decabromodiphenylethane, and dodecachlorododecahydrodimethanodibenzocyclooctene), molybdenum compounds (such as molybdenum oxide and ammonium octamolybdate), metallocenes (such as ferrocene), antimony compounds (such as antimony metal, antimony trioxide, antimony pentoxide and sodium antimonate), zinc compounds (such as mixed metal oxide of zinc and magnesium, or zinc sulfide) and bismuth compounds (such as bismuth subcarbonate), as well as a process for producing them.

It is also an object of the present invention to provide stable dispersions of these materials in water, organic liquids or meltable solids, and to provide a method for producing the same.

Colloidal particles of insoluble, solid flame retardant and/or smoke suppressant compounds are advantageous for use as external flame retardant coatings on textiles or as internal flame retardant additives to systems such as coatings, plastic, textiles and rubber.

Dispersions of such particles are convenient, because they allow the particles to be transported, while simultaneously inhibiting the particles from coalescing into larger agglomerates.

These and other objects and advantages have been achieved by the present invention, wherein colloidal-sized particles of insoluble solid flame retardant and/or smoke suppressant compounds are provided by means of a high energy mill, such as a media mill, even though commercial suppliers of such milling equipment do not suggest that such particle sizes can be achieved.

According to an embodiment of the present invention, an agitated media mill loaded with comminuting media is provided with a slurry comprising a fluid vehicle and particles of a solid compound having flame retardant or smoke suppressant properties. The slurry is processed in the agitated media mill until the particles are reduced in size by at least 10%, more preferably 50 to 90%, and even more preferably 10 to 99%. Moreover, the particles have a volumetric average particle size of less than 0.5 micron, preferably 0.01 to 0.5 micron, more preferably 0.01 to 0.25 micron, and even more preferably 0.01 to 0.1 micron. It is preferred that at least 99% of said particles have sizes less than 1 micron. More preferably at least 99.9% of the particles should have sizes less than 1 micron. It is also preferred that the slurry further comprise a dispersion agent.

Other objects and advantages of the invention and alternative embodiments will readily become apparent to those skilled in the art, particularly after reading the detailed description, and examples set forth below.

DETAILED DESCRIPTION OF THE PREFERRED EMBODIMENTS

Wet media milling is the preferred process for making the finely divided particles of the present invention In general, the ultimate characteristics of material comminuted in a wet media mill, particularly the particle size, is determined by several processing variables.

For example, the type of mill can affect the ultimate characteristics of the comminuted materials. The mill type can also determine how quickly a particular result may be achieved.

Other factors also determine the ultimate characteristics of the comminuted material, as well as the time and energy it takes to achieve them. Examples of such factors include the following:

(1) In wet media milling, smaller media are more efficient in producing finer particles within times of 10 minutes and less.

(2) More dense media and higher tip speeds are desired to impart more energy to the particles being comminuted.

(3) Lower fluid viscosities are beneficial in comminuting particles.

(4) As the particles are reduced in diameter, exposed surface areas increase, and a dispersion agent is generally used to keep small particles from agglomerating. In some cases dilution alone can help achieve a particular ultimate particle size, but a dispersion agent is generally used to achieve long-term stability against agglomeration.

The above and other factors that influence comminuting performance is discussed in the paragraphs that follow.

As used herein "particle size" refers to a volumetric average particle size as measured by conventional particle size measuring techniques such as sedimentation, photon correlation spectroscopy, field flow fractionation, disk centrifugation, transmission electron microscopy, and dynamic light scattering. A dynamic light scattering device such as a Horiba LA-900 Laser Scattering particle size analyzer (Horiba Instruments, Irvine, Calif.) is preferred by the present inventors, because it has advantages of easy sample preparation and speed. The volumetric distribution of the sample relates to the weight distribution.

Milling Equipment

The milling equipment preferred for the practice of the invention are generally known as a wet agitated media mills, wherein comminuting media are agitated in a milling chamber. The preferred method of agitation is by means of an agitator comprising a rotating shaft, such as those found in attritior mills. The shaft may be provided with disks, arms, pins, or other attachments. The portion of the attachment that is radially the most remote from the shaft is referred to herein as the "tip". The mills may be batch or continuous, vertical or horizontal. A ball mill is an example of a rudimentary agitated media mill.

A horizontal continuous media mill equipped with an internal screen having hole sizes that are ½ to ⅓ the media diameter is preferred as an efficient media mill for the practice of the present invention. High loadings of media are possible (e.g., loadings of 92%).

An increase in the amount of comminuting media in the chamber will increase comminuting efficiency by decreasing the distances between individual comminuting media particles and increasing the number of surfaces available to shear the material to be comminuted. The volume of comminuting media can be increased until the comminuting media constitutes up to about 92% of the mill chamber bulk volume (dead space between particles is excluded). At levels substantially above this point, the media locks up.

Starting Materials

By the present invention, flame retardants or smoke suppressants can be wet milled to levels that are currently not achievable with dry milling techniques.

Within reason, the size of the feed material that is to be comminuted is not critical. For example, antimony trioxide can be reduced to a 0.10 micron average particle size with an agitated media mill using the process of the present invention, whether starting from particles that have an average particle size of 4.3 microns, 2.0 microns, or 0.6 micron. However, in generally, the feed material should not be more than 10% of the size of the comminuting media. Other flame retardants such as decabromodiphenyl oxide and zinc borate can be similarly reduced to 0.25 and 0.14 micron or less; respectively, in short comminuting times.

Faster milling times can be achieved, if smaller starting materials are used. Thus, it is preferable to start with particles that are as small as is economically feasible, to reduce milling time. For example, 0.5 micron antimony trioxide feed material (as measured by Transmission Electron Microscopy) can be comminuted to a desired size (e.g., 0.1 micron) in a shorter time than can a 4.3 micron material. For this reason; antimony trioxide having a 0.5 micron average particle size is preferred to material having a larger particle size. When such material is used, a tight particle distribution can be achieved, as well as a short milling time.

Comminuting Media

Acceptable comminuting media for the practice of the present invention include sand, glass beads, metals, and ceramics. Preferred glass beads include barium titanite (leaded) soda lime (unleaded), and borosilicate. Preferred metals include carbon steel, stainless steel and tungsten carbide. Preferred ceramics include yttrium stabilized zirconium oxide, zirconium silicate, and alumina. The most preferred comminuting media for the purpose of the invention is yttrium stabilized zirconium oxide.

Each type of media has its own advantages. For example, metals have high specific gravities, which increase comminuting efficiency due to increased impact. Metal costs range from low to high, and contamination may be an issue. Glasses are advantageous from the standpoint of low cost and the availability of small sizes as low as 0.004 mm. Such small sizes make possible a finer ultimate particle size. The specific gravity of glasses, however, is lower than other media and more milling time is required. Finally, ceramics are advantageous from the standpoint of low wear, low porosity and ease of cleaning.

The comminuting media used for particle size reduction are preferably spherical. As noted previously, smaller comminuting media sizes result in smaller ultimate particle sizes. The comminuting media for the practice of the present invention preferably have an average size ranging from 0.004 to 1.2 mm, more preferably 0.012 to 0.2 mm. By using properly selected comminuting media, the milling process of the present invention actually comminutes particles, rather than deagglomerating clumps of particles—a task for which media mills are normally used.

Fluid Vehicles

Fluid vehicles in which the particles may be comminuted and dispersed include water, organic liquids (such as dimethylacetamide or ethylene glycol), polyvinyl chloride plasticizers (such as diisodecylphthalate) and low melting solids such as waxes or fats wherein the milling is conducted at temperatures greater than the melting point of the waxes or fats. In general, as long as the fluid vehicle used has a reasonable viscosity and does not adversely affect the chemical or physical characteristics of the particles, the choice of fluid vehicle is optional. Water is ordinarily preferred.

Dispersion Agents

Dispersion agents preferably act to wet newly exposed surfaces that result when particles are broken open. Dispersion agents also preferably stabilize the resulting slurry of milled particles by providing either (1) a positive or negative electric charge on the milled particles or (2) steric blocking through the use of a large bulking molecule. An electric charge is preferably introduced by means of anionic and cationic surfactants, while steric blocking is preferably performed by absorbed polymers with charges on the particle which repel each other. Zwitterionic surfactants can have both anionic and cationic surfactant characteristics on the same molecule.

Preferred dispersion agents for the practice of the invention include wetting agents (such as Triton X-100 and Triton CF-10, sold by Union Carbide, Danbury, Conn., and Neodol 91-6, sold by Shell Chemical); anionic surfactants (such as Tamol 731, Tamol 931 and Tamol-SN, sold by Rohm & Haas, Philadelphia, Pa., and Colloid 226/35, sold by Rhone Poulenc); cationic surfactants (such as Disperbyke 182 sold by Byke Chemie, Wellingford, Conn.); amphoteric surfactants (such as Crosultain T-30 and Incrosoft T-90, sold by Croda, Inc., Parsippany, N.J.); and non-ionic surfactants (such as Disperse-Ayd W-22 sold by Daniel Products Co., Jersey City, N.J. Most preferred dispersion agents are anionic surfactants such as Tamol-SN.

Other Milling Parameters

The relative proportions of particles to be comminuted, fluid vehicles, comminuting media and dispersion agents may be optimized for the practice of the present invention.

Preferably, the final slurry exiting the mill comprises the following: (1) 5 to 60 wt %, more preferably 15 to 45 wt % of the particle to be comminuted (2) 40 to 95 wt %, more preferably 55 to 85 wt % of the fluid vehicle; and (3) 2 to 15 wt %, more preferably 6 to 10 wt % of the dispersion agent.

Preferably the comminuting media loading as a percent of the mill chamber volume is 80 to 92%, more preferably 85 to 90%.

The agitator speed controls the amount of energy that is put into the mill. The higher the agitator speed, the more kinetic energy is put into the mill. Higher kinetic energy results in greater comminuting efficiency, due to higher shear and impact. Thus, an increase in agitator RPM results in an increase in comminuting efficiency. Although generally desirable, it is understood by those skilled in the art that an increase in comminuting efficiency will be accompanied by a concurrent increase in chamber temperature, chamber pressure, and wear rate.

The tip speed of the agitator represents the maximum velocity (and, thus, kinetic energy) experienced by the particles to be milled. Thus, larger diameter mills can impart media velocities equal to those of smaller mills at a lower RPM.

Residence time (referred to cumulatively as retention time) is the amount of time that the material spends in the comminuting chamber while being exposed to the comminuting media. Residence time is calculated by simply determining the comminuting volume that is available for the mill and dividing this figure by the rate of flow through the mill (throughput rate). In general, a certain residence time will be required to achieve the ultimate product characteristics desired (e.g., final product size). If this residence time can be reduced, a higher throughput rate can be achieved, minimizing capital costs. For the practice of the present invention, the residence time can vary, but is preferably less than 15 minutes, and more preferably less than 10 minutes.

It is often desirable to stage two or more mills in series, particularly when dramatic reductions in particle size are necessary to optimize comminution efficiency. Maximum particle size reduction within a given milling step typically ranges from about 10:1 to as high as about 40:1 and is to some extent dependent upon media size. As a result, the number of milling steps increases as the overall size reduction requirement increases. Effects similar to that of staged mills can also be achieved using a single mill by collecting the output and repeatedly feeding the output through the mill. However, residence time may be longer to achieve similar ultimate particle size.

EXAMPLES

The following examples, as well as the foregoing description of the invention and its various embodiments, are not intended to be limiting of the invention but rather are illustrative thereof. Those skilled in the art can formulate further embodiments encompassed within the scope of the present invention Example 1

A 10 liter horizontal continuous media mill (Netzsch, Inc., Exton, Pa.) was 90% filled with YTZ (yttrium stabilized zirconium oxide) media with an average diameter of 0.2 mm and a specific gravity of 5.95 (Tosoh Corp., Bound Brook, N.J.). A 0.1 mm screen was installed inside the mill at the outlet. Forty-five pounds of antimony trioxide with an average starting particle size of 2.0 microns (Cookson Specialty Additives, Anzon Division, Philadelphia, Pa.) were slurried in 55 pounds of water and 4.5 pounds of Tamol-SN.

The mill was operated at a tip speed that averaged 2856 feet per minute. After 7.5 minutes of retention time (5 passes through the mill) the average particle size, by volume, was reduced to 0.102 micron and 99.9% of the particles had sizes less than 0.345 micron.

Example 2

The same mill, media and loading as in Example 1 were used. This time, antimony trioxide feed having a 0.6 micron average particle size (Cookson Specialty Additives, Anzon Division, Philadelphia, Pa.) was used. Thirty pounds of the antimony trioxide were slurried with 70 pounds of water and 1.8 pounds of Tamol-SN and 0.9 pounds of Triton CF-10.

The tip speed during the run averaged 2878 feet per minute. After 4.8 minutes of retention time in the mill (4 passes), the volume average particle size was 0.11 micron and 99.9% of the particles had sizes less than 0.31 micron.

Example 3

The same mill, media, antimony trioxide and loading as in Example 1 were used. This time no surfactants were used.

Twenty-eight pounds of the antimony trioxide were slurried with 100 pounds of water Tip speed was 3023 feet per minute. After 2.4 minutes of retention time (2 passes). The average particle was 0.13 micron with 99.9% of the particles having sizes less than 1.06 micron.

Since the viscosity of the product was high, 35 additional pounds of water were added. After 1.8 minutes of additional retention time (2 extra passes), the average particle size was further reduced to 0.10 microns with 99.9% of the particles having sizes less than 0.32 micron.

Example 4

The same mill, media, and loading as in Example 1 were used. Thirty pounds of 4 micron antimony trioxide feed material (Cookson Specialty Additives, Anzon Division) were slurried with 70 pounds of water and 2.8 pounds of Tamol-SN. Tip speed was 2860 feet per minute. After 7 minutes of retention time (5 passes), the average particle size was 0.10 micron with 99.9% of the particles having sizes less than 1.2 micron.

Example 5

Using the same mill, media and loading of Example 1, 80 pounds of a brominated organic flame retardant (decabromodiphenyl oxide) (Arblemarle, Inc. Baton Rouge, La.; Great Lakes, Lafayette, Ind.; Ameribrom, Inc., New York, N.Y.) were slurried with 55 pounds of water The starting particle size averaged 2.7 microns with some particles as large as 10 microns. After 10.4 minutes of retention time (6 passes), the average particle size was 0.25 micron, with 99.9% of the particles having a size less than 2.70 micron.

Example 6

The 10 liter horizontal media mill of Example 1 was 90% filled with 4–6 mm electrofused zirconia/silica ceramic beads having a specific gravity of 3.85 (SEPR, Mountainside, N.J.). The same 0.1 mm screen of Example 1 was used inside the mill.

50 pounds of 2 micron antimony trioxide feed were mixed with 11 pounds of water and 5 pounds of Tamol-SN. After 7.8 minutes of retention time, the average particle size was 0.20 micron, with 99.9% of the particles having sizes below 0.46 micron.

Example 7

A 10 liter horizontal media mill of Example 1 was 90% loaded with borosilicate glass beads having a 0.093 mm mean diameter and a specific gravity of 2.6 sold by Potters Industries. A 0.025 mm screen was used in the mill.

Fifty pounds of 0.6 micron antimony trioxide were slurried with 61 pounds of water and 5 pounds of Tamol-SN. The tip speed was 3420 feet per minute. Mill amperage was only 67% of similar runs using the 5.95 specific gravity media. The resulting antimony trioxide product had a 0.09 micron average particle size, with 100% of the particles having sizes less than 0.30 micron.

Example 8

The 10 liter continuous horizontal media mill Example 1 was 90% loaded with the YTZ media of Example 1. Fifty pounds of zinc borate having an average particle size of 9.8 microns (Cookson Specialty Additives, Anzon Division, Philadelphia, Pa.) were slurried in 93 pounds of water and 3 pounds of Tamol-SN.

Tip speed was 2788 feet per minute. After 8.9 minutes (4 passes) of retention time, the average particle size was reduced to 0.14 micron, with 99.9% of the particles having sizes less than 0.41 micron.

Example 9

An attritor (Union Process, Inc., Akron, Ohio) with a 750 cc tank volume was loaded with 250 cc of YTZ powder (Metco, Inc., Westbury, N.Y. screened to a size of 0.053 mm. 180 g of the slurry of Example 1 were added to the attritor. After running the attritor at 4000 RPM (3600 ft/min tip speed) for 60 minutes, the average particle size of the resulting product was 0.07 microns.

What is claimed is:

1. Finely divided particles of a solid chemical compound having flame retardant or smoke suppressant properties, said particles having a volumetric average particle size of less than 0.1 micron, said particles having a size distribution such that at least 99% of said particles have sizes less than about 1 micron, and said particles being produced by comminution, with the proviso that said solid chemical compound is not antimony trioxide.

2. The finely divided particles of claim 1, wherein at least 99.9% of said particles have sizes less than 1 micron.

3. The finely divided particles of claim 1, wherein said solid chemical compound is selected from the group consisting of hydrated salts, organic phosphates, metal borates, polyamides, solid halogenated flame retardants with a melting point greater than 250° C., molydenum compounds, metallocenes, antimony compounds other than antimony trioxide, zinc compounds, and bismuth compounds.

4. The finely divided particles of claim 1, wherein said solid chemical compound is selected from the group consisting of aluminum trihydrate, magnesium sulphate pentahydrate, magnesium hydroxide, hydrated magnesium carbonate, ammonium polyphosphate, melamine pyrophosphate, barium metaborate, melamine, brominated polymers, ethylene bis-tetrabromophthalamide, decabromodiphenylethane, dodecachlorododecahydrodimethanodibenzocyclooctene, molybdenum oxide, ammonium octamolybdate, ferrocene, antimony metal, antimony pentoxide, sodium antimonate, mixed metal oxide of zinc and magnesium, zinc sulfide and bismuth subcarbonate.

5. The finely divided particles of claim 1, wherein said solid chemical compound is zinc borate.

6. The finely divided particles of claim 1, wherein said solid chemical compound is decabromodiphenyloxide.

7. A dispersion comprising a fluid vehicle, a dispersion agent and the particles of claim 1.

8. The dispersion of claim 7, wherein said fluid vehicle is selected from the group consisting of organic liquids, polyvinyl chloride plasticizers and low melting point waxes or fats.

9. The dispersion of claim 7, wherein said fluid vehicle is selected from the group consisting of dimethylacetamide, ethylene glycol and diisodecylphthalate.

10. The dispersion of claim 7, wherein said fluid vehicle is water.

11. The dispersion of claim 7, wherein said dispersion agent is selected from the group consisting of cationic surfactants, amphoteric surfactants, and non-ionic surfactants.

12. The dispersion of claim 7, wherein said dispersion agent is selected from the group consisting of wetting agents and anionic surfactants.

13. A process for producing finely divided particles of a solid compound having flame retardant or smoke suppressant properties comprising:

loading an agitated media mill with comminuting media, a fluid vehicle, and starting particles of a solid compound having flame retardant or smoke suppressant properties; and agitating said comminuting media, fluid vehicle, and starting particles until said starting particles are reduced in size by at least 10% and comminuted particles are produced within said agitated media mill having a size distribution wherein said comminuted particles have a volumetric average particle size of less than 0.1 micron and wherein at least 99% of said comminuted particles is sized less than 1micron, with the proviso that said solid compound is not antimony trioxide.

14. The process of claim 13, wherein said slurry further comprises a dispersion agent.

15. The process of claim 13, wherein said agitated media mill is operated at a tip speed ranging from 1000 to 6000 feet per minute.

16. The process of claim 13, wherein said comminuting media are provided in an amount sufficient to fill about 80 to 92% of the bulk volume within said mill.

17. The process of claim 13, wherein said comminuting media are selected from the group consisting of sand, glass beads, metals, and ceramics.

18. The process of claim 17, wherein said comminuting media are selected from the group consisting of barium titanite, leaded soda lime, borosilicate, carbon steel, stainless steel, tungsten carbide, zirconium silicate, and alumina.

19. The process of claim 18, wherein said media is yttrium stabilized zirconium oxide.

20. The process of claim 13, wherein said solid chemical compound is selected from the group consisting of hydrated salts, organic phosphates, metal borates, polyamides, solid halogenated flame retardant with a melting point greater than 250° C., molybdenum compounds, metallocenes, antimony compounds other than antimony trioxide, zinc compounds, and bismuth compounds.

21. The process of claim 13, wherein said solid chemical compound is selected from the group consisting of zinc borate and decabromodiphenyloxide.

22. The process of claim 13, wherein said fluid vehicle is selected from the group consisting of organic liquids, polyvinyl chloride plasticizers and low melting point waxes or fats.

23. The process of claim 13, wherein said fluid vehicle is selected from the group consisting of dimethylacetamide, ethylene glycol and diisodecylphthalate.

24. The process of claim 13, wherein said fluid vehicle is water.

25. The process of claim 13, wherein said dispersion agent is selected from the group consisting of cationic surfactants, amphoteric surfactants, and non-ionic surfactants.

26. The process of claim 13, wherein said dispersion agent is selected from the group consisting of wetting agents and anionic surfactants.

27. Finely divided particles of a solid chemical compound having flame retardant or smoke suppressant properties, produced by the process of claim 13.

28. The process of claim 13, wherein said comminuting media has an average size ranging from about 0.012 to 0.2 mm.

29. The process of claim 28 wherein said comminuting media is yttrium stabilized zirconium.

30. The method of claim 29 wherein said comminuting media has an average diameter of about 0.2 mm.

31. A process for producing finely divided antimony trioxide comprising:
loading an agitated media mill with ceramic comminuting media, a fluid vehicle, a dispersion agent and starting particles of antimony trioxide; and
agitating said comminuting media, fluid vehicle, dispersion agent and antimony trioxide starting particles until said antimony trioxide starting particles are reduced in size by at least 10% and comminuted antimony trioxide particles are produced within said agitated media mill having a size distribution wherein said comminuted antimony trioxide particles have a volumetric average particle size of less than 0.1 micron, and wherein at least 99% of said comminuted antimony trioxide particles are sized less than 1 micron.

32. The process of claim 31 wherein said dispersion agent is an anionic surfactant.

33. The process of claim 31 wherein said fluid vehicle is water.

34. The process of claim 31 wherein said ceramic comminuting media is yttrium stabilized zirconium oxide having an average diameter of about 0.2 mm.

35. Finely divided particles of antimony trioxide having a volumetric average particle size of less than 0.1 micron, at least 99% of said particles having sizes less than about 1 micron, said particles being produced by comminution and being dispersed in a fluid vehicle containing a dispersion agent.

36. The finely divided particles of claim 35 wherein said dispersion agent is an anionic surfactant.

37. The finely divided particles of claim 35 wherein said fluid vehicle is water.

38. A process for producing finely divided antimony trioxide comprising:
loading an agitated media mill with ceramic comminuting media, a fluid vehicle, a dispersion agent and starting particles of antimony trioxide; and
agitating said comminuting media, fluid vehicle, dispersion agent and antimony trioxide starting particles until said antimony trioxide starting particles are reduced in size by at least 10% and comminuted antimony trioxide particles are produced within said agitated media mill having a size distribution wherein said comminuted antimony trioxide particles have a volumetric average particle size of less than 0.25 microns and wherein at least 99% of said comminuted antimony trioxide particles are sized less than 1 micron, wherein said size distribution is produced in a residence time of less than 15 minutes.

39. A process for producing finely divided particles of a solid compound having flame retardant or smoke suppressant properties comprising:
loading an agitated media mill with comminuting media, a fluid vehicle, and starting particles of a solid compound having flame retardant or smoke suppressant properties; and
agitating said comminuting media, fluid vehicle, and starting particles until said starting particles are reduced in size by at least 10% and comminuted particles are produced within said agitated media mill having a size distribution wherein said comminuted particles have a volumetric average particle size of less than 0.25 microns and wherein at least 99% of said comminuted particles is sized less than 1 micron, wherein said size distribution is produced in a residence time of less than 15 minutes, with the proviso that said solid compound is not antimony trioxide.

* * * * *

UNITED STATES PATENT AND TRADEMARK OFFICE
CERTIFICATE OF CORRECTION

PATENT NO. : 5,948,323
DATED : September 7, 1999
INVENTOR(S) : John McLaughlin

It is certified that error appears in the above-identified patent and that said Letters Patent is hereby corrected as shown below:

| Column | Line | |
|---|---|---|
| 3 | 7 | After "invention" insert --.--. |
| 3 | 53 | Change "attritior" to --attritor--. |
| 6 | 62 | After "water" insert --.--. |
| 7 | 2 | Change "microns" to --micron,--. |
| 8 | 21 | Change "molydenum" to --molybdenum--. |
| 9 | 28 | Change "retardant" to --retardants--. |
| 9 | 44 | Change "claim 13" to --claim 14--. |

Signed and Sealed this

Twenty-seventh Day of February, 2001

Attest:

NICHOLAS P. GODICI

*Attesting Officer*    *Acting Director of the United States Patent and Trademark Office*